Figure 1:
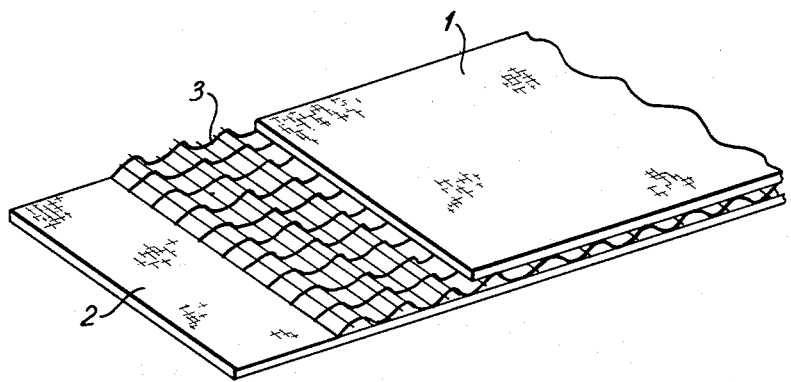

Nov. 17, 1964  S. G. HOFFMAN ETAL  3,156,926
METHOD FOR MAKING A MOLDED HAT
Filed March 16, 1959  5 Sheets-Sheet 1

INVENTORS
STANLEY G. HOFFMAN
FRED C. VAN ESS
BY THOMAS J. GILLICK, JR.

Edward Haire
ATTORNEY

Nov. 17, 1964   S. G. HOFFMAN ETAL   3,156,926
METHOD FOR MAKING A MOLDED HAT
Filed March 16, 1959   5 Sheets-Sheet 2
FIG. 3
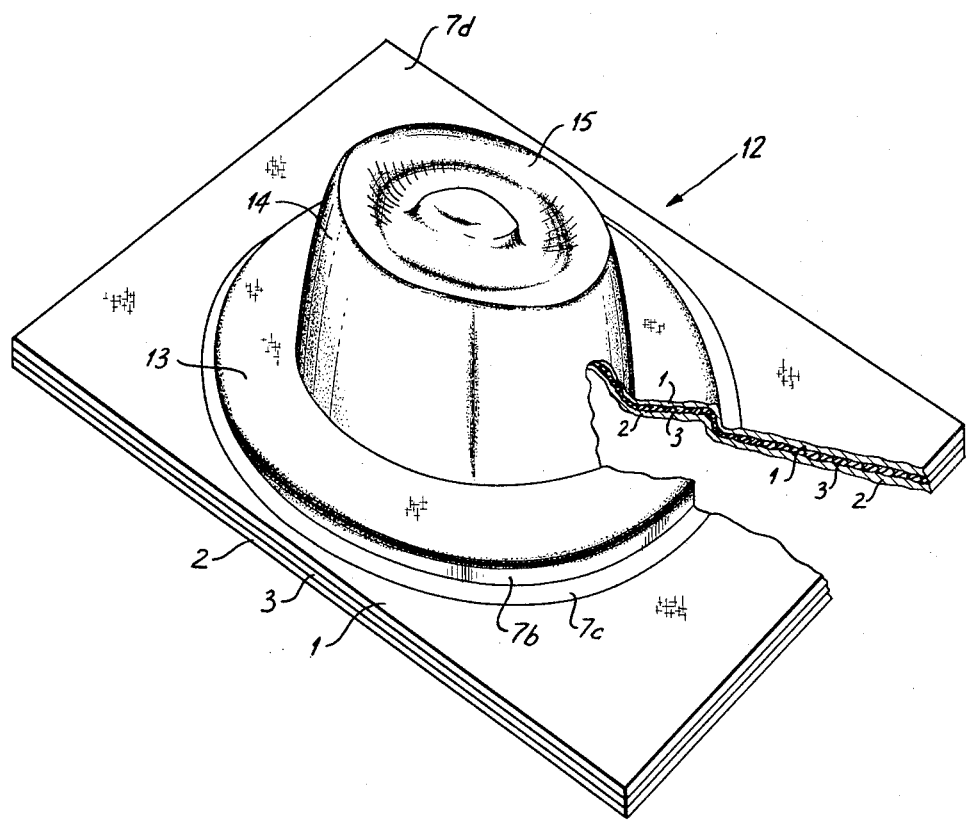
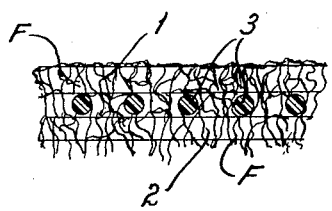
FIG. 11
INVENTORS.
STANLEY G. HOFFMAN
FRED C. VAN ESS
BY THOMAS J. GILLICK, JR.
Edward Halle
ATTORNEY Nov. 17, 1964 S. G. HOFFMAN ETAL 3,156,926
METHOD FOR MAKING A MOLDED HAT
Filed March 16, 1959 5 Sheets-Sheet 3
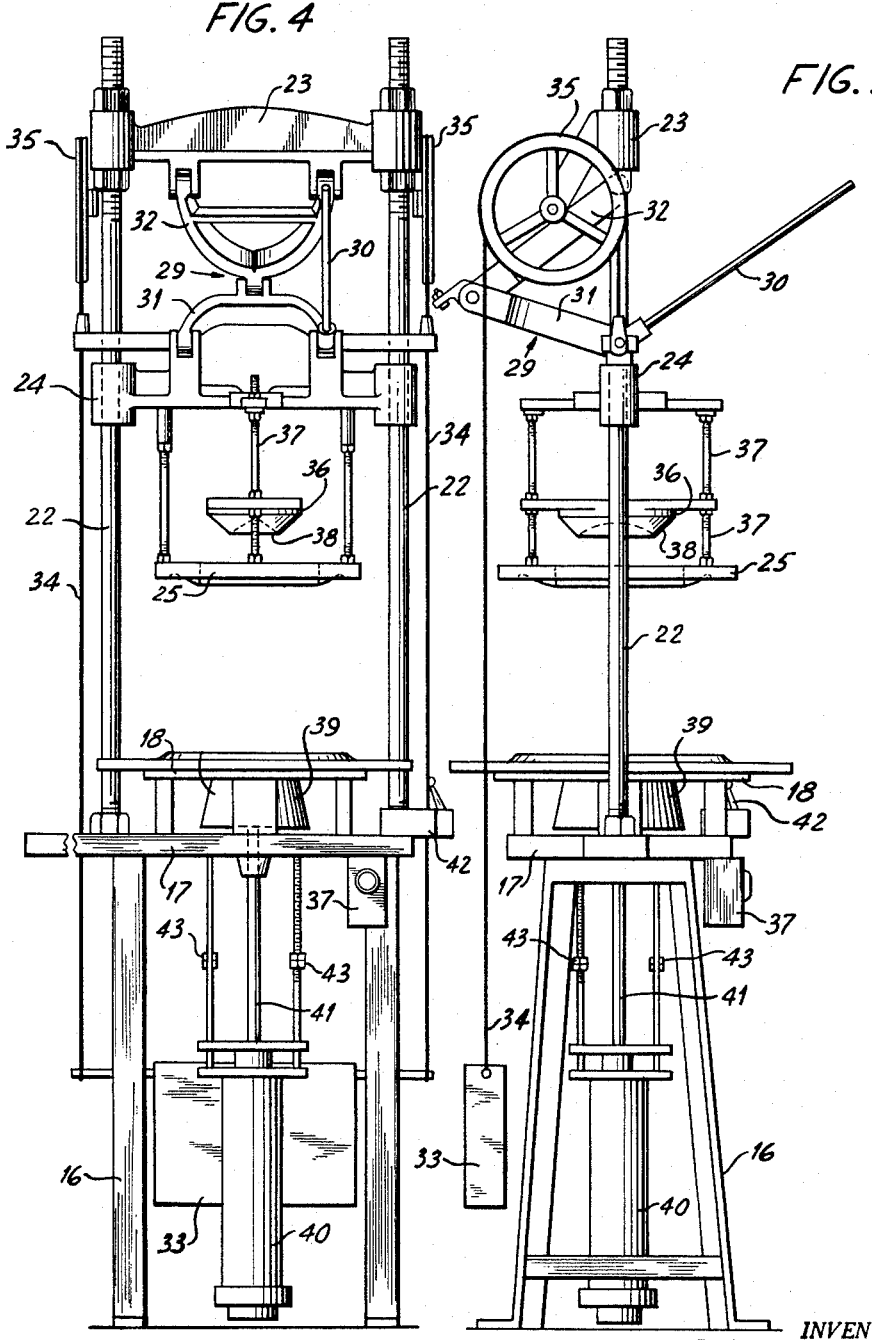
INVENTORS
STANLEY G. HOFFMAN
FRED C. VAN ESS
BY THOMAS J. GILLICK, JR.
Edward Halle
ATTORNEY Nov. 17, 1964   S. G. HOFFMAN ETAL   3,156,926
METHOD FOR MAKING A MOLDED HAT
Filed March 16, 1959   5 Sheets-Sheet 4

INVENTORS
STANLEY G. HOFFMAN
FRED C. VAN ESS
BY THOMAS J. GILLICK, JR.

Edward Halle
ATTORNEY

Nov. 17, 1964     S. G. HOFFMAN ETAL     3,156,926
METHOD FOR MAKING A MOLDED HAT
Filed March 16, 1959                     5 Sheets-Sheet 5

INVENTORS
STANLEY G. HOFFMAN
FRED C. VAN ESS
BY THOMAS J. GILLICK, JR.

Edward Halle
ATTORNEY

United States Patent Office 3,156,926
Patented Nov. 17, 1964

3,156,926
METHOD FOR MAKING A MOLDED HAT
Stanley G. Hoffman, Norwalk, Fred C. Van Ess, Danbury, and Thomas J. Gillick, Jr., Glenville, Conn., assignors to Hat Corporation of America, Norwalk, Conn.
Filed Mar. 16, 1959, Ser. No. 799,745
3 Claims. (Cl. 2—194)

This invention relates to an improvement in the manufacture of molded hats and to an improved hat as a product of manufacture, made from improved moldable fabrics, and to the method of making such hats.

In the usual method of manufacturing felt hats, a cone is first made by blowing a measured quantity of carroted fur feltable fibres on a rotating suction cone to build up a cone shaped body thereon. After removal from the cone former, the cones are usually individually processed for shrinking, compacting, fulling, etc. and ultimate blocking into the formed hat. Wool felt hats are made in an essentially similar fashion.

By this process each hat must first be formed as a cone of the desired fur or wool, felted, shrunk, dyed, and blocked and finished to the desired shape. Each hat, therefore, represents individual hand labor from the beginning of the felt cone making process to the production of the finished hat, thereby increasing the ultimate cost of such hats. All molded felt articles require a steaming to effect the final shaping. This has drawbacks since the goods have to be dried and subjected to another finishing operation to restore the feel or handle lost in the steaming operation.

Only certain materials are suitable for use in the (felt) hat making process as now practiced. Normally, coney, rabbit, muskrat, beaver and other furs and hairs are used for producing the finest hats. Wool felts may also be used or mixtures of wool felts with various synthetic and natural materials. The use of wool or wool blends in making hats by the customary way results in an inferior product. Only materials having good felting characteristics can be used in the normal coning process used for hat making and many of those materials are becoming more and more scarce and difficult to secure and hence more expensive.

It is an object of the present invention to provide a method of making hats from flat-needle felted fabrics which fabrics can be molded into forms by shrinking and stretching and which molded articles can then be set to retain the molded form.

It is another one of the objects of the present invention to provide a method of hat making whereby flat needle-felted fabrics of various types can be manufactured into satisfactory hat bodies.

Another object of the invention is to provide such a flat needle-felted fabric having an intermediate thermoplastic shrinkable member therein giving strength and firmness to the fabric while permitting various batting materials to be needled on each side of the intermediate layer and to be shrunk and molded with said thermoplastic members to form the molded hats.

Another object of the invention is to provide a new method of making hats whereby the individual forming of the hat cones is eliminated and a flat stretchable fabric with needle-felted surfaces may be used in the hat making process.

Another object of the invention is to provide a hat of improved construction having an intermediate thermoplastic woven skeleton to each side of which a layer of fibers is needle-felted whereby hats having the normal appearance of fine fur felt hats may be produced by the improved method hereinafter described without expensive hand labor.

Various other objects and advantages of our invention will appear as the description proceeds.

In principle we have found that if a loosely woven thermoplastic or thermosetting fabric which undergoes shrinking when subject to heat, has fibers in the form of batts secured on one or both sides thereof by needle felting, the intermediate layer can be molded by a process of shrinking and stretching in hat molds to shape the crown and brim of a hat. The loosely woven thermoplastic or thermosetting material having batts needle-felted to one or both sides shrinks when subjected to heat, thus firmly affixing the fibers of the batts needle-felted to the woven material and in effect results in a material having the characteristics of felt. This synthetic felt while hot can be molded since the intermediate layer is thermoplastic and when the material is cooled will take a set given it by the mold. This loosely woven intermediate layer can be made of any synthetic fiber which will shrink when heated and is thermoplastic or thermosetting. Such materials as fabric woven from fibers of a copolymer of vinyl chloride and acrylonitrile (Dynel), a modified type of copolymer of vinyl chloride and acrylonitrile (Verel), and fabric woven from linear polyethylene staple fiber (Fiber B), are some of the many synthetic fabrics that can be utilized.

As the material for the carded batt layers, we may use natural fibers such as fur, silk, cashmere, vicuna, wool, or cotton as well as synthetic fibers, such as "Dacron," "Orlon," "Nylon," "Acrilon," or the like. However, it will be understood that we do not intend to be limited in the choice of fibers since various types of fibers both natural and synthetic, may be used in the process hereinafter described. The fibers can be utilized alone or in blend with each other to form batts of mixed fibers. In the event only one side of the flat needle-felted fabric is to be exposed, the other side may be the loosely woven shrinkable thermoplastic material or a carded fiber batt made from less expensive fibers than those used on the outer face needled to the intermediate layer.

The process of manufacture of molded hats includes the steps of
(1) preparing the material in flat form, as batts, needle-felted to the intermediate thermoplastic support
(2) cutting the blanks for the hats
(3) heating the cut blanks between the hot plates, and
(4) molding the blanks to form the finished hats.

Figure 2:
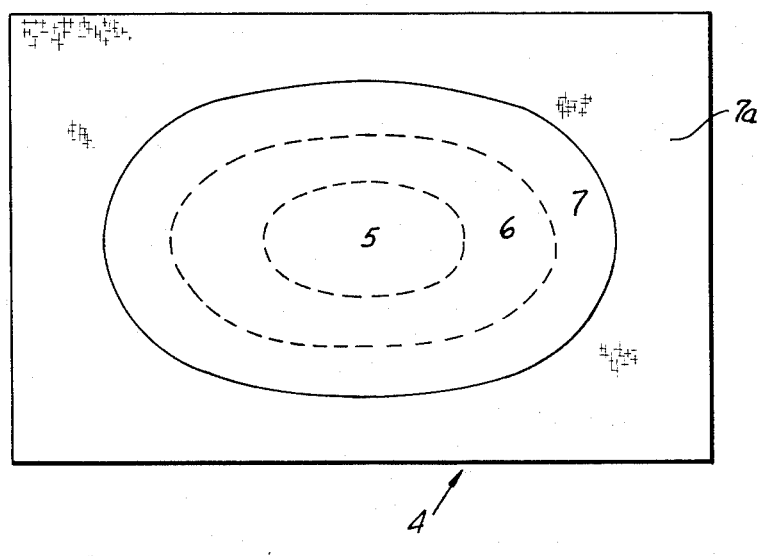
Figure 6:
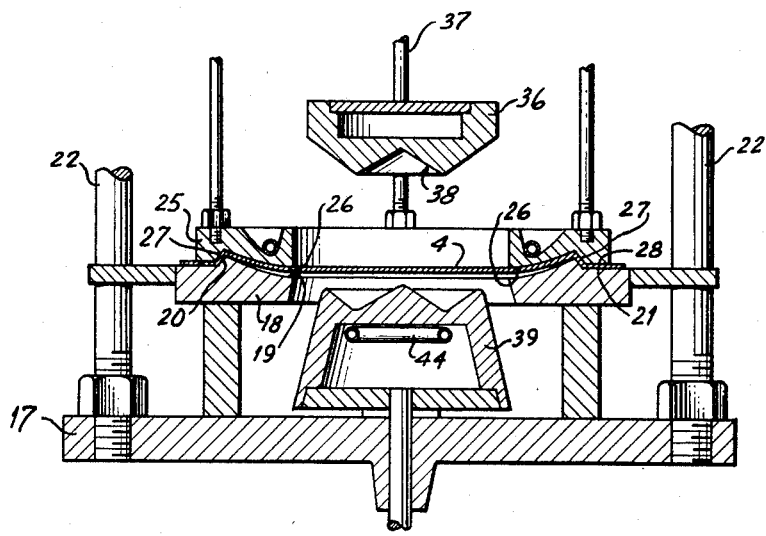
Figure 7:
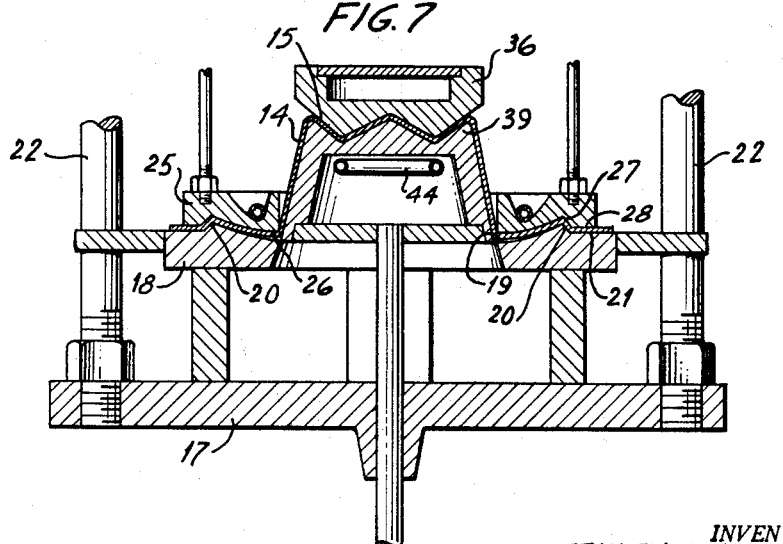
Figure 8:
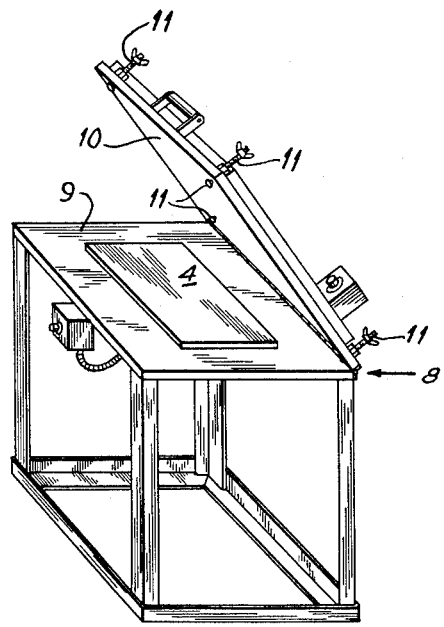
Figure 9:
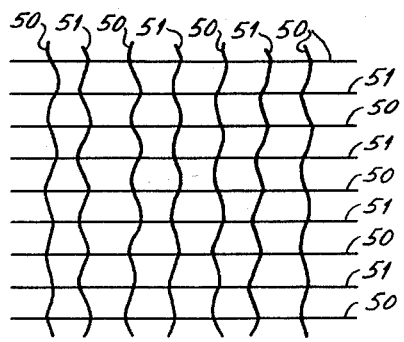
Figure 10:
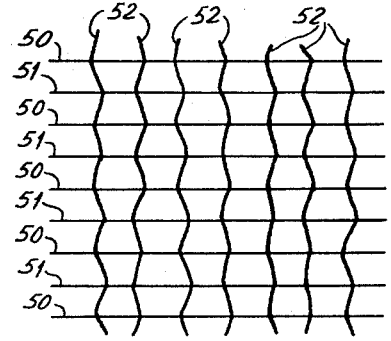

In the accompanying drawings:
FIG. 1 is an illustrative view of the hat blank fabric;
FIG. 2 is a plan view of the hat blank 4 cut from the hat fabric, after shrinking;
FIG. 3 is the illustration of the finished hat body in perspective with parts broken away to indicate the multiple layers of the fabric;
FIG. 4 is a front view of the machine for molding the hats;
FIG. 5 s a side view of the machine;
FIG. 6 is an enlarged transverse sectional view of the die members showing the hat blank 4 clamped in position and the crown mold prior to raising;
FIG. 7 is a view similar to FIG. 6 with the crown mold raised to mold the crown and brim of the hat;
FIG. 8 is a perspective view of the hot plates comprising the heating apparatus;
FIG. 9 is a diagrammatic plan view of a portion of another form of material for molding hats;
FIG. 10 is a view similar to FIG. 9 showing a further modification in a type of material for molding hats, and
FIG. 11 is a fragmentary cross-sectional view on an exaggerated scale of the flat composite needle felted material used in the manufacture of the hat body in accordance with the invention.

PREPARING THE FELTED MATERIAL

As previously set forth, the new flat needle-felted fabric suitable for making the molded hats of the present process comprises a woven intermediate supporting and thermoplastic layer of synthetic material, the fibers of which are under tension and will undergo shrinking when heated, with a layer of material in the form of a batt, needle-felted to one or both sides of the woven thermoplastic layer. The material to be needle-felted may be natural wool or fur fibers, natural felts or synthetic fibers, such as "Orlon," "Dacron," "Perlon" (an isocyanate fiber), or the like as described above, which are capable of being needle-felted to produce a felt-like mass. The fibers need not be fibers which will felt without needling and as indicated may be blends of various fibers.

In preparing the new material, the natural or synthetic fibers are first prepared by blending, picking and carding to form a web. The synthetic or natural fibers are first fed into a picker and then to a carding machine where a web is formed. Two or more of these webs are combined in layers by a finishing card into a batt.

The composite material is formed from these carded batts by placing the woven thermoplastic cloth intermediate layer between two carded batts which may be of different fibers and passing this through a needle loom of the type used to make needled felt. In this operation, some fibers of the batt are carried through the interstices of the woven dynel or other intermediate layer and into the opposite carded layer so that there is a bonding of the carded batts on both sides to the woven intermediate support. This operation is known in the trade as needle felting. In the event only one side of the material is desired to be finished as a felt like suface, only one layer of batting need be needle-felted to the intermediate layer. The composite needled felt may then be passed between heated rolls to compress the batt and flatten the fibers if desired. In FIG. 1, and FIG. 11, the numerals 1 and 2 illustrate the outer carded batt layers of natural or synthetic fibers and 3 illustrates the intermediate woven thermoplastic layer, the layers 1 and 2 being needle-felted to the intermediate layers and to each other through the intermediate layer. The batt layers 1 and 2 and the intermediate layer 3 are held together by the fibers F, as shown in FIG. 11, which have been carried from batt 1 to batt 2 and visa versa through the intermediate layer 3 by the needle felting process as aforesaid. The flat needle-felted fabric thus produced has been found to be excellent for forming hat bodies. If contrasting colors are desired or if more convenient, the fibers may be dyed before being processed to make the batts. Novelty fabric of contrasting hues can be made by blending fibers dyed different shades prior to making the batts.

CUTTING THE BLANKS FOR THE CLOTH ARTICLE

The flat needle-felted fabric is next cut to suitable size in preparation for forming the molded hat. The cutting operation is simple and consists only of cutting by hand or by suitable power operated cutting dies, a hat blank 4 of the flat needle-felted fabric large enough for the type of hat desired. A blank 4 approximately 20″ by 21″ is used for forming a man's hat. However, the size of the flat hat forming blank will vary with the shape and size of the hat to be produced. The blank should be of such size that excessive stretching beyond that necessary to form the crown is avoided.

The complete hat is formed from the one piece of flat goods. It is not necessary to cut separate pieces for brim, top and crown. FIG. 2 illustrates the hat blank 4. The parts shown in the circles correspond roughly to parts of the finished hat body: 5 is the top of the crown, 6 is the side body of the crown, and 7 the brim of the hat.

HEATING AND SHRINKING THE HAT BLANK 4

The flat needle-felted fabric, prepared as above is subjected to heating to cause the intermediate woven layer to shrink and the flat needle-felted fabric to take the properties of felt. This heating can be from 210° to 400° F. depending upon the nature of the intermediate layer and the needle-felted layers. The heating can be accomplished by placing the blank 4 between heated plates, or by infra red lamps, ovens, steam (as in a tailor's pressing machine) or any other convenient and suitable means. In practicing the present invention, it is preferred to use a heater 8 having electrically heated hot plates 9 and 10. The hot fabric can be molded after heating and will retain the shape of the mold upon cooling.

The hat blank 4 is heated as follows: The blank 4 is placed on the lower hot plate 9. The upper hot plate 10 is then lowered and heat is applied to both sides of the blank 4. Care should be taken to prevent binding of the material under the weight of the upper hot plate 10. Screw means 11 are provided at the corners of the upper hot plate 10 to space the hot plates 9 and 10 for the proper gap which should be relatively as wide as the thickness of the material in the blank 4 being heated.

During the heating process the blank 4 should be permitted to shrink approximately 10% to 40% in size. Shrinkage is controlled by the temperature and the duration of the heat application.

The type of hot plates 9 and 10 that we use are heated by the usual types of electrical heating elements and we may provide automatic controls (not shown) such as thermostats for the temperature control and timers for the control of the duration of the heating period.

The higher the temperature and the greater the duration of the heat the stiffer and firmer the hat body 12. The lower the temperature and shorter duration the softer the hat body 12. Also different materials will require different relative temperatures to produce hat bodies of substantially equal firmness. This will be more particularly shown in the examples below.

MOLDING THE HAT BODY

The molded hat body 12 as shown in FIG. 3, comprising a brim 13, a crown 14 and top of crown 15 is formed from the heated and shrunk blank 4 by means of a method for mechanically setting the shape of the molded hat body 12 after the shrinkage which occurs when the blank 4 is heated. During this process the brim portion 7 of the blank 4 is progressively stretched from the edge toward the crown 6 and the crown 6 is progressively further stretched from the brim 7 to the center of the crown 5.

While this method may be carried out by several different types of operations and molds, it is at present preferred to carry it out by means of the novel apparatus shown in FIGS. 4 to 7 wherein a frame 16 is provided with a base 17 on which is mounted a lower, fixed, annular brim mold 18 having a curved inner upper surface 19. The lower brim mold 18 also has an intermediate annular ridge 20 and an outer annular flat portion 21. Extending above the base is a pair of posts 22 having their upper ends joined together by a cross-bar 23. Slidably mounted on the posts is a carriage 24 having adjustably secured thereto an upper, movable annular brim die 25 having inner lower concave molding surfaces 26, against which the brim 13 is stretched and molded. The upper brim die 25 likewise has an intermediate annular groove-like portion 27 and an outer annular flat portion 28. The carriage is connected by toggle mechanism 29 to the crossbar 23 and is provided with a handle 30 whereby upon downward movement of the handle 30 the links 31, 32 of the toggle mechanism are moved into aligned position and force the movable upper brim die 25 at its intermediate and outer portions 27 and 28 into engagement with the blank 4 when disposed over the fixed lower brim die 18 at corresponding portions 20 and 21. When the blank 4 is placed on the apparatus it is clamped in place between the groove 27 and flat 28 of the upper brim mold 25 and the ridge 20 and flat 21 of the lower brim mold 18. The only portions of the blank 4 which are clamped are held between the mentioned elements 20, 21 and 27, 28. No other clamps are used.

During the molding and setting process, it is necessary to permit the portion of the blank 4 disposed between the mold portion 19 and 26 to be stretched. Sufficient space is therefore provided between mold portions 19 and 26 to permit free movement of the material of the blank 4 without clamping. The actual molded shape of the brim 13 will be controlled and determined by element 26 of the upper mold 25 and not by element 19 of the lower mold portion 18.

A counterweight 33 is connected to the carriage by cables 34 extending over pulleys 35 carried by the crossbar 23 to normally maintain the carriage 24 in raised position.

The carriage 24 also has a top crown die member 36 adjustably fixed thereon by means of threaded posts 37. The outer crown die member 36 is adapted to be positioned over the center of the blank 4 and has on its undersurface the formation 38 for molding the top of the crown 15. When the upper brim die 25 is moved into position, the movement of the carriage 24 automatically locates the top of the crown by positioning the top crown die 36 as shown in FIG. 7.

Disposed below the lower fixed brim die 18 and located under the center of the blank 4 is the normally retracted (lowered) inner crown die 39 which is adapted to be moved upwardly through the open centers of the brim dies 18 and 25 and into engagement with the portions of the blank 4 clamped there-between and to move said portion of the blank 4 upwardly and into engagement with the top crown die 36 to form the top crown 15 and side crown 14 portions of the hat body 12.

While manual or mechanical means for moving the inner crown die 39 upwardly through the center of the annular brim dies 18 and 25 to form the crown 14, 15 may be employed, it is herein illustrated as an air pressure actuated means (partially shown) comprising a cylinder 40 mounted on the base 16 and having a piston 41 connected to the inner crown die 39 which cylinder 40 and piston 41 are actuated by air pressure controlled by a manually operated valve 42. Adjustable stops 43 control movement of the die in molding engagement with the top crown die 36. It will be seen that as this inner die 39 (which may be heated by heater 44 to maintain heat in the blank 4 to counteract premature cooling prior to molding and setting, where necessary), moves upwardly it will engage and progressively stretch the center or top crown portion 5 of the blank 4 upwardly and away from the outer portions 7 of the blank 4 gripped by elements 20, 21 and 27, 28 of the closed brim dies 18 and 25 to form the crown 14, 15 and the brim 13 of the hat body 12. As the inner die 39 completes its stroke it will effectively clamp the top of the crown 15 against the outer crown die 36 and this will fix the top crown 15 configuration in its molded shape. (If heating element 44 is used the heat is turned off and the mold is permitted to cool.) As soon as the hat body 12 is molded, the handle 30 is reversed and die sections are separated and the molded hat body 12 is removed.

After the molded hat body 12 is removed it will have an appearance as in FIG. 3 of the drawings. The top of the crown 5 and the side body of the crown 6 as seen in the hat blank, shown in FIG. 2, will now appear as the crown 15 and 14 in FIG. 3. The brim 7 as seen in FIG. 2 will not appear as the brim 13 in FIG. 3. The balance of the material of the blank 4 designated by the reference numerals 7a in FIG. 2 appears as three separate parts designated 7b, 7c and 7d in FIG. 3. That portion of the mold hat body 12 which was clamped between elements 20 and 27 of the mold will be designated as the outer brim edge 7b. That portion of the hat body 12 which was clamped between the elements 21 and 28 of the mold will now be designated as outer molded portion 7c and the balance of the blank 4 which was outside of the mold is now designated as the unmolded portion 7d.

The molded hat body 12 is then trimmed around the edge of the brim 13 by means of any suitable cutting tool and can be finished by the usual steps known to the trade. A sweatband and other ornamentation as well as a binding for the brim (not shown) may be applied, if desired. The outer brim edge 7b can be used, if desired, as a brim edge reinforcement by trimming the molded hat body 12 between the outer brim edge 7c and the outer molded portion 7d instead of trimming it at the edge of the grim 13. If this is done, the outer brim edge 7b is folded up to the brim 13 and sewn around the edge thereof and finished in any usual manner. This provides a double reinforced edge for the brim 13.

During the heating period the woven intermediate shrinkable thermoplastic layer of the flat needle-felted fabric undergoes shrinking, and the said thermoplastic fibers upon cooling adhere to each other and contract to the fibers of the outer batt layers needled through the woven fabric more firmly. This forms a bond which gives the fabric firmer body and it looks, acts and feels like a high grade felt.

Since the inner and outer needle-felted fabric layers are needled intimately to the intermediate supporting layer and to each other the flat sheet of fabric can be stretched and drawn to produce the crown 14, 15 and brim 13 of the hat 12 by virtue of the shrinkable and stretchable nature of the intermediate layer and at the same time the inner and outer felted layers attached to the intermediate layer move with the woven supporting layer and do not crack, pull apart or produce non-uniform thicknesses in the formed hat body.

As an illustrative embodiment of the manner in which the invention may be practiced, the following examples are presented:

*Example I*

"Dacron" synthetic fibers were subjected to the known conventional steps of picking, carding and batt forming to form a carded batt of 4 oz. (square yard weight). Two of these batts were needled, one on each side, to an intermediate layer of a thermoplastic shrinkable woven synthetic fabric, "Dynel 901" or "Dynel 904" (U.S. Rubber Company), which also weighs 4 oz./sq. yd., thereby forming a composite needle-felted material with a weight of 12 oz./sq. yd.

This needle-felted yard goods was cut into hat blanks 4 of 20 x 21″ in size and then heated on the hot plates 9 and 10 to about 340° F. for a heating time of two minutes. The blank 4 was then placed upon the machine and clamped into place. The piston actuated crown forming die 39 was moved upward forming the hat crown 14 and 15 and brim 13 out of the still plastic material. The die 39 was allowed to remain in the raised position until the thermoplastic intermediate layer cooled sufficiently to take the set of the crown forming die. This required cooling with cool air for 30 seconds.

The molded hat body 12 should be permitted to cool for at least 30 seconds before removal from molding apparatus to permit the mold to set. The cooling period is not critical so long as the molded hot body 12 is permitted to cool sufficiently to set prior to removal. For Example I, as well as for the other examples given herein, we have given an optimum temperature and a duration time. However, in Example I as in the other examples, we also give a range of temperatures and duration of heat.

Firmer and stiffer hat bodies 12 will result from the application of higher heat and from increasing the duration of the heat; softer and more pliable hat bodies 12 will result from using lower heat and by decreasing the duration of the heat. For example, where it is desired to produce a hat body with a snap brim so that the brim will be stiff, it is desirable to increase the temperature of the heat or to increase the duration of the heat or to do both.

The result was that the yard goods conformed to the shape of the forming dies, forming a hat body 12 which was firm in shape, and resistant to moisture and accidental deformation. This hat body 12 has the appearance and properties of a cone made felt hat body and is more resistant to moisture and accidental deformation.

While the exact temperature and times given above are preferred, satisfactory hat bodies 12 may be made in accordance with this example within temperature ranges of 310° to 370° and duration of heat from one to three minutes.

*Example II*

Orlon fibers in the form of batts 1 and 2 needled to a woven "Verel" were submitted to the same steps as described in Example I and the result again was a hat body of the same excellent qualities. The preferred temperature was found to be 370° for two minutes, satisfactory range 325° to 400° 1 to 3 minutes.

*Example III*

A mixture of 55% of a long staple dyed fur fiber and 45% Orlon was subject to the conventional steps of blending, picking, carding, and batt forming to form a carded batt of 6 oz. (sq. yd. weight). Due to the loss of fur in the blending, picking and carding steps, the finished carded batts contain approximately 50% fur and 50% Orlon. Two of these batts (1 and 2) were needled, one on each side, to an intermediate layer of "Dynel 901" weighing 4 oz. per sq. yd. A hat body 12 was made from this flat needle-felted fabric within the range of temperature and heat duration, as described in Example I.

*Example IV*

A grey dyed fool fiber was subjected to the conventional steps of blending, picking, carding and batt forming to form a carded batt of 6 oz. per square yards. Two of these batts were needled (1 and 2) one on each side, to an intermediate layer of a thermoplastic shrinkable woven synthetic fiber, "Fiber B," a linear polyethylene staple fiber woven into a construction similar to Dynel 901 and sold by Union Carbide and Carbon Corp.

The flat needle-felted fabric was cut into blanks and subjected to the hat forming operation described in Example I except that the polyethylene fiber shrinks at a lower temperature and need only be heated to 250° F. at two minutes. (Satisfactory range 210° to 300° F. at one to three minutes.)

*Example V*

A brown dyed wool fiber was formed into a carded batt as in Example I. An undyed viscose rayon was likewise formed into a carded batt as in Example I. A flat needle-felted fabric was made by needle felting the wool batt to one side and the viscose rayon batt to the other side of an intermediate woven layer of "Dynel 901." A hat body was then made from this fabric as set forth in Example I. The optimum temperature and range is the same as Example I.

The above flat needle-felted fabric can also be made with a woven intermediate layer of shrinkable "Dacron S–54," a polyester fiber sold by Du Pont. If Dacron S–54 is used, it required exposure to a temperature of 215° F. at two minutes, to shrink. (Satisfactory range 180° F. to 250° F. at one to three minutes duration.) The use of Dacron S–54 results in a relatively soft hat body.

The advantages of the process may be readily apparent. The new laminated material may be used to make a hat of any desired shape or size, these characteristics being dependent on the mold used to form the hat. Moreover, the process is much simpler than conventional hat making methods, eliminating a number of initial hand felting operations, and permitting hat bodies to be made from flat yard goods by the simple steps of cutting and molding which then may be finished by the usual pressing, buffing, trimming and other processes and methods known to the hat art.

Hats made in accordance with this invention have unusual shape retention qualities which are not present in fur felt, wool felt, cloth or ordinary needle-felted hats made without our thermoplastic liner. For example, our hats may be crushed out of shape, washed in soap and water or dry cleaned by conventional methods and will return to their molded shape without the necessity of further pressing, blocking or finishing.

Another advantage is that the material in our hats is porous and may be worn in the summer or in hot climates with a greater degree of comfort and protection from the heat of the sun. Porosity may be controlled during the needling operation of the fabric. The more the fabric is subjected to needling, the tighter and less porous it becomes and the resulting hat will be firmer. By limiting the needling operation on the fabric, we can produce a hat with a body of good porosity.

Since certain changes in carrying out the above processes and certain modifications in the articles which embody the invention may be made without departing from its scope, it is intended that the above-description shall not be interpreted in a limiting sense.

For example, we may provide a hat fabric material as shown in FIG. 9 of the drawings. This type of material may be made by making batts of Dynel and slicing portions of the batts and twisting the same into yarn for weaving. Similar batts may be made of a combination of Dynel and Orlon and making yarn for weaving in the same manner. Reference to FIG. 9 shows a material made in the warp of alternate threads of Dynel yarn 50 and combination of Dynel and Orlon yarn 51. The woof of the material illustrated in FIG. 9 is likewise made of alternate thread of Dynel yarn 50 and a combination of Dynel and Orlon yarn 51. The resulting fabric may then be molded in accordance with the processes described hereinabove.

As a further example, we may provide material as shown in FIG. 10 of the drawings, in which batts comprising a combination of Dynel and fur fibers are made into yarn for weaving in the usual manner. The warp of the material in FIG. 10 may be made of threads of this combination of Dynel and fur yarns 52. The woof of the said material may be made of alternate threads of Dynel 50 and Dynel and Orlon 51.

Thus we may provide these materials as shown in FIG. 9 and FIG. 10 which will have the setting qualities of the thermoplastic yarn and will also have the desirable qualities of other natural or synthetic fibers to enhance the appearance of the finished hat. There may also be other examples and other variations which come within the scope of the claims hereinbelow.

Wherefore, we claim:

1. The method for making hat bodies consisting of a one piece crown and brim which comprises the steps of: forming a composite, flat, needle-felted fabric, consisting of at least one layer of woven thermoplastic synthetic fibers which shrink when heated, and at least one layer of fibers in the form of batts needle-felted to said layer of woven synthetic fibers; then cutting a suitable hat blank from said needle-felted fabric; then applying heat to shrink the said woven thermoplastic layer; and then, while the said woven thermoplastic layer is still warm and in a plastic state, molding the said hat blank in an unheated mold of the desired shape to cause the said hat blank to be stretched and molded and to have a set, as a resulting hat body, in the form desired.

2. The method for making hat bodies consisting of a one piece crown and brim which comprises the steps of: forming a composite, flat, needle-felted fabric, consisting of an intermediate layer of woven thermoplastic synthetic fibers which shrink when heated, and outer layers in the form of batts needle-felted to each side thereof; then cutting a suitable hat blank from said needle-felted fabric; then applying heat to shrink the said woven thermoplastic layer; and then while the said woven thermoplastic layer is still warm and in a plastic state, molding the said hat blank in an unheated mold of the desired shape to cause the said hat blank to be stretched and molded and to have a set, as a resulting hat body, in the form desired.

3. The method for making hat bodies consisting of a one piece crown and brim which comprises the steps of: forming a composite, flat, needle-felted fabric, consisting of an intermediate layer of woven thermoplastic synthetic fibers which shrink when heated, and outer layers in the form of batts needle-felted to each side thereof; then cutting a suitable hat blank from said needle-felted fabric; then applying heat to shrink the said woven thermoplastic layer; and then while the said woven thermoplastic layer is still warm and in a plastic state, molding the said hat blank in an unheated mold of the desired shape to cause the said hat blank to be stretched and molded and then cooling the said molded hat blank while still in the said mold to produce a set, as a resulting hat body, in the form desired.

References Cited in the file of this patent
UNITED STATES PATENTS

| | | |
|---|---|---|
| 265,541 | Rogers | Oct. 3, 1882 |
| 667,699 | Heaton | Feb. 12, 1901 |
| 1,682,870 | Van Heusen | Sept. 4, 1928 |
| 1,813,861 | Lee | July 7, 1931 |
| 2,065,077 | Kiwad | Dec. 22, 1936 |
| 2,112,384 | Sloan et al. | Mar. 29, 1938 |
| 2,404,634 | Hodshon | July 23, 1946 |
| 2,455,619 | Shrager et al. | Dec. 7, 1948 |
| 2,588,228 | Gates | Mar. 4, 1952 |
| 2,713,443 | Cottrell et al. | July 19, 1955 |